(12) United States Patent
Marks et al.

(10) Patent No.: US 8,712,924 B2
(45) Date of Patent: Apr. 29, 2014

(54) REAL-TIME PRICING OF SHIPPING VENDORS

(75) Inventors: Peter Marks, San Anselmo, CA (US); Duane P. O'Brien, Oakland, CA (US)

(73) Assignee: Lynch Marks LLC, Berkeley, CA (US)

( * ) Notice: Subject to any disclaimer, the term of this patent is extended or adjusted under 35 U.S.C. 154(b) by 1181 days.

(21) Appl. No.: 12/009,033

(22) Filed: Jan. 15, 2008

(65) Prior Publication Data

US 2008/0288368 A1 Nov. 20, 2008

Related U.S. Application Data

(60) Provisional application No. 60/928,516, filed on May 16, 2007.

(51) Int. Cl.
G06Q 30/00 (2012.01)

(52) U.S. Cl.
USPC .......... 705/335; 705/330; 705/26.4; 705/26.1

(58) Field of Classification Search
USPC ..................... 705/1, 26, 26.1–27.2
See application file for complete search history.

(56) References Cited

U.S. PATENT DOCUMENTS

| | | | |
|---|---|---|---|
| 739,201 | A | 9/1903 | Morton |
| 4,319,328 | A | 3/1982 | Eggert |
| 4,832,204 | A | 5/1989 | Handy et al. |
| 5,477,462 | A | 12/1995 | McClung |
| 5,717,596 | A | 2/1998 | Bernard et al. |
| 5,787,400 | A | 7/1998 | Weber |
| 6,119,051 | A | 9/2000 | Anderson, Jr. et al. |
| 6,298,337 | B1 | 10/2001 | Kubatzki |
| 6,427,032 | B1 | 7/2002 | Irons |
| 7,082,417 | B1 | 7/2006 | Marry et al. |
| 7,149,726 | B1 | 12/2006 | Lingle et al. |
| 7,209,897 | B2 | 4/2007 | Ghiloni |
| 2002/0023057 | A1 | 2/2002 | Goodwin et al. |
| 2002/0032573 | A1 * | 3/2002 | Williams et al. ............ 705/1 |
| 2003/0083890 | A1 | 5/2003 | Duncan et al. |
| 2003/0115612 | A1 | 6/2003 | Mao |
| 2004/0188522 | A1 | 9/2004 | Ashaari |
| 2004/0230543 | A1 | 11/2004 | Baker |
| 2004/0243501 | A1 | 12/2004 | Duffey |
| 2004/0243522 | A1 | 12/2004 | Foth |
| 2004/0263901 | A1 | 12/2004 | Critelli et al. |
| 2005/0171791 | A1 | 8/2005 | Chimenti et al. |

(Continued)

FOREIGN PATENT DOCUMENTS

GB 2428315 A * 1/2007 .............. H04L 29/06

OTHER PUBLICATIONS

Online Publication, www.eshipper.com/about, Publication Date: Nov. 18, 2006.*

(Continued)

*Primary Examiner* — Michael Misiaszek
(74) *Attorney, Agent, or Firm* — Carr & Ferrell LLP

(57) ABSTRACT

Systems and methods for real-time pricing of shipping vendors are provided. Various shipping vendors may be queried concerning shipping specifications. Some embodiments provide for a query to be transmitted to a shipping vendor through an interface associated with the particular shipping vendor. In response to the query, real-time pricing information associated with the shipping specifications is received and displayed to a user. Upon the user designating a shipping vendor, customized shipping labels for each shipping vendor may be generated.

20 Claims, 4 Drawing Sheets

(56) References Cited

U.S. PATENT DOCUMENTS

| | | |
|---|---|---|
| 2005/0171919 A1 | 8/2005 | Baker et al. |
| 2005/0237203 A1 | 10/2005 | Burman et al. |
| 2005/0237204 A1 | 10/2005 | Burman et al. |
| 2005/0278263 A1 | 12/2005 | Hollander |
| 2006/0020505 A1 | 1/2006 | Whitehouse |
| 2006/0080266 A1 | 4/2006 | Kiani |
| 2006/0089869 A1 | 4/2006 | Mundy |
| 2006/0089897 A1 | 4/2006 | Maas |
| 2006/0173797 A1 | 8/2006 | Sheehan |
| 2006/0173798 A1 | 8/2006 | Charroppin |
| 2006/0229895 A1 | 10/2006 | Kodger, Jr. |
| 2006/0282271 A1 | 12/2006 | Ananda et al. |
| 2006/0282277 A1 | 12/2006 | Ng |
| 2007/0000990 A1 | 1/2007 | Baldassari et al. |
| 2007/0022059 A1 | 1/2007 | Heiden |
| 2007/0043651 A1 * | 2/2007 | Xiao et al. ............ 705/37 |
| 2007/0073551 A1 | 3/2007 | Williams et al. |
| 2007/0124084 A1 | 5/2007 | Torre-Bueno |
| 2007/0260561 A1 | 11/2007 | Martin |
| 2008/0126218 A1 | 5/2008 | Alvarado et al. |
| 2008/0210749 A1 | 9/2008 | Skaaksrud |
| 2008/0255863 A1 | 10/2008 | Mack et al. |
| 2008/0283586 A1 | 11/2008 | Marks et al. |
| 2008/0288422 A1 | 11/2008 | Marks et al. |
| 2008/0288463 A1 | 11/2008 | Marks et al. |
| 2009/0057403 A1 | 3/2009 | Marks et al. |
| 2009/0076918 A1 | 3/2009 | Blanchet |
| 2009/0094082 A1 | 4/2009 | Willoughby |
| 2010/0057596 A1 | 3/2010 | Sundel |
| 2010/0223173 A1 | 9/2010 | Kadaba |

OTHER PUBLICATIONS www.pr.com Online Article, "Shipping Sidekick . . . ", Publication Date: Aug. 31, 2007.*

PS Ship Label Server, Published by Lynch Marks LLC as noted by web.archive.org on Feb. 13, 2006 of website http://web.archive.org/web/20060213043422/psship.com/pdf/psship_ups.pdf.

* cited by examiner

PS SHIP

Shipping Options ship date [Today ▼]

declared value [____] USD (max 50,000)

signature [No Delivery Confirmation ▼]

options ☐ Saturday Delivery ☐ Saturday Pickup packaging [Envelop or Letter ▼]

*Ground services available only with "Other packaging"* dimensions weight length width height
(lbs & in) [__] [__] [__] [__]

[Get Rates]

PS|Ship™ Service Options

↪ FedEx
↪ DHL
↪ Overnite Express:

[Stop Shopping and Show Rates]
[Exit and Return to Vendor Select]

*Delivery times and pricing presented are approximate and will vary with shipping options and parcel destination. Select the desires service and proceed to the vendor's shipping page for additional service options and courtesy quotes.*

| vendor | delivery | service | amount |
|---|---|---|---|
| FedEx | 1/18/2008 4:30PM | FedEx Express Saver ↺ | $18.02 |
| FedEx | 1/17/2008 4:30PM | FedEx 2 day | $8.39 |
| Overnite | 1/16/2008 4:00PM | Next Day Overnite | $8.46 |
| DHL | 1/17/2008 5:30PM | DHL Second Day | $10.55 |
| Overnite | 1/16/2008 11:00AM | Morning Overnite | $10.84 |
| FedEx | 1/16/2008 3:00PM | FedEx Standard Overnite | $11.08 |
| Overnite | 1/16/2008 1:00PM | One Overnite | $12.33 |
| FedEx | 1/16/2008 10:30AM | FedEx Priority Overnite | $12.85 |
| DHL | 1/16/2008 3:00PM | DHL Next Afternoon | $14.11 |
| DHL | 1/16/2008 12:00AM | DHL Express | $16.18 |
| DHL | 1/16/2008 10:30AM | DHL Express 10:30 AM | $19.18 |
| Overnite | 1/16/2008 9:00AM | Early Overnite ◄ | $32.84 |
| FedEx | 1/16/2008 10:00AM | FedEx First Overnite | $43.39 |

© 2003-2008 Lynch Marks LLC. All Rights Reserved. PS|Ship™ is a trademark of Lynch Marks LLC. Other product and company names listed are trademarks or tradenames of their respective companies.

FIG. 4

REAL-TIME PRICING OF SHIPPING VENDORS

CROSS-REFERENCE TO RELATED APPLICATIONS

The present application claims the priority benefit of U.S. provisional patent application No. 60/928,516, filed May 16, 2007 and entitled "Methods and Systems for Shipping Management." The present application is related to nonprovisional application titled "Integrated Databases for Tracking Shipping Information" and "Documenting Mail Work Flows," filed concurrently herewith. The disclosures of the aforementioned applications are incorporated herein by reference.

BACKGROUND OF THE INVENTION

1. Field of the Invention

The present invention relates to shipment management. More specifically, the present invention relates to real-time pricing of shipping vendors.

2. Description of Related Art

There are presently a variety of ways to ship an item. The shipping vendors available to a user may include various well-known national and international vendors, such as FedEx®, United Parcel Service (UPS®), United States postal service (USPS®), and DHL®, as well as various local couriers. The availability of shipping services by shipping vendors may vary from location to location. For example, a local courier may only provide service within a particular city. Further, some shipping vendors may not deliver internationally.

A shipment may also be sent using a variety of shipping options, including declared value, packaging options, recipient acknowledgement, and the like. For example, an item may need to be delivered in a padded envelope by a certain date and acknowledged by recipient signature. The availability of various shipping options may differ from vendor to vendor. For example, a particular vendor may not offer overnight shipping; another vendor may require overnight shipments to be ready for pick-up by a certain time; and another vendor may have size and weight restrictions on overnight shipments. In addition to size and weight, various other packaging specifications (e.g., shape, contents of package, value of contents) may also limit the availability of shipping options.

The variety of available shipment options and shipping vendors allows users to tailor their shipments in a variety of ways. Further, multiple shipping vendors allow for alternatives should a first shipping vendor be unable to ship an item or provide a certain shipping option. However, these multiple options for shipment complicate the decision-making process with regard to which shipping vendor to use and which shipping options to choose.

Cost generally is an important factor in choosing a shipping vendor and shipping options. The cost of shipping an item, however, is highly variable among vendors and may further vary based on the shipping options, article specifications, etc. Many users cannot afford to ship every article for overnight hand delivery with special packaging, insurance, etc. On the other hand, a user may need to ensure that a certain item be delivered by a certain time and acknowledged by the recipient. To choose a shipping vendor and shipping options, therefore, requires that the user determine and compare costs while assessing the benefit provided by the various shipping options available from each shipping vendor.

Presently, determining costs may require a user to separately contact each shipping vendor (e.g., visit websites for each shipping vendor), provide article specifications to each vendor, determine what shipping options are available from each vendor, and gather quotes from each vendor concerning shipments and a variety of shipping specifications. Gathering quotes in such a manner is inefficient and time-consuming, and will provide only limited information since both the rates and availability of each shipping vendor and shipping option are not static. Further, shipping quotes are extremely time-sensitive, i.e., the cost for delivery by a certain date from a particular vendor generally increases as time passes. Certain shipping options may also become unavailable after a certain time.

Another presently available method for pricing shipments among multiple vendors includes consulting rate tables for each shipping vendor. Consulting a rate table may also not provide any useful bases for comparison among vendors, because such rate tables are only valid until rates change. Rates may change weekly based on various factors, including shipping volume. In some systems, new and updated rates tables may need to be uploaded into various systems for processing.

There is, therefore, a need in the art for improved systems and methods for real-time pricing of shipping vendors.

SUMMARY OF THE INVENTION

Exemplary systems and methods of the present invention provide for real-time pricing of shipping vendors. Information concerning desired shipping specifications is received from a user. A query based on the shipping specifications is sent to various shipping vendors. In response to the query, real-time pricing information is received and displayed to the user based on the shipping specifications. The user may also choose a vendor or multiple vendors, and shipping labels may be generated.

Methods for real-time pricing of shipping vendors may further include configuring a user device, using account information for configuration, querying asynchronously, using vendor-specific interfaces to query each vendor, using information provided by a contacts manager as shipping specifications, and generating vendor-specific shipping labels based on shipping specification and/or pricing information. In some embodiments, the method may further include displaying price quotes by various sort options (e.g., vendor, cost, delivery date). Further embodiments may include indicating the fastest and least expensive options (e.g., using graphics, color).

Systems for real-time pricing of shipping vendors may include a vendor database, a communications interface, and a display generator module. The vendor database is configured to store information concerning various shipping vendors. Those shipping vendors are queried through the communications interface, and the responses to the queries are displayed in a display generated by display generator module. In various embodiments of the present invention, the communications interface may include various vendor-specific interfaces. A system may further include a label generator module configured to generate one or more shipping labels based on information in the query responses.

Some embodiments of the present invention include computer media containing computer-executable instructions for carrying out a method for real-time pricing of shipping vendors: The instructions provide for querying shipping vendors concerning one or more shipping specifications, receiving real-time price quotes, and generating a display of the received real-time pricing information from the one or more shipping vendors. Further, some instructions may be included that provide for asynchronous queries and using vendor-specific interfaces to query each shipping vendor.

BRIEF DESCRIPTION OF THE FIGURES

FIG. 4 is an exemplary screenshot displaying query results of real-time pricing of shipping vendors.

DETAILED DESCRIPTION

The present invention includes systems and methods for real-time pricing of shipping vendors. Queries based on various shipping specifications are sent to various shipping vendors. In response to the queries, real-time pricing information is received, and a display including some or all of the information may be generated and displayed to the user. In some embodiments, the queries are sent to each shipping vendor using vendor-specific interfaces. Upon receiving the real-time pricing information, a user may designate one or more shipping vendors, and shipping labels based on the shipping specifications and/or pricing information for each designated shipping vendor may be generated.

Figure 1:
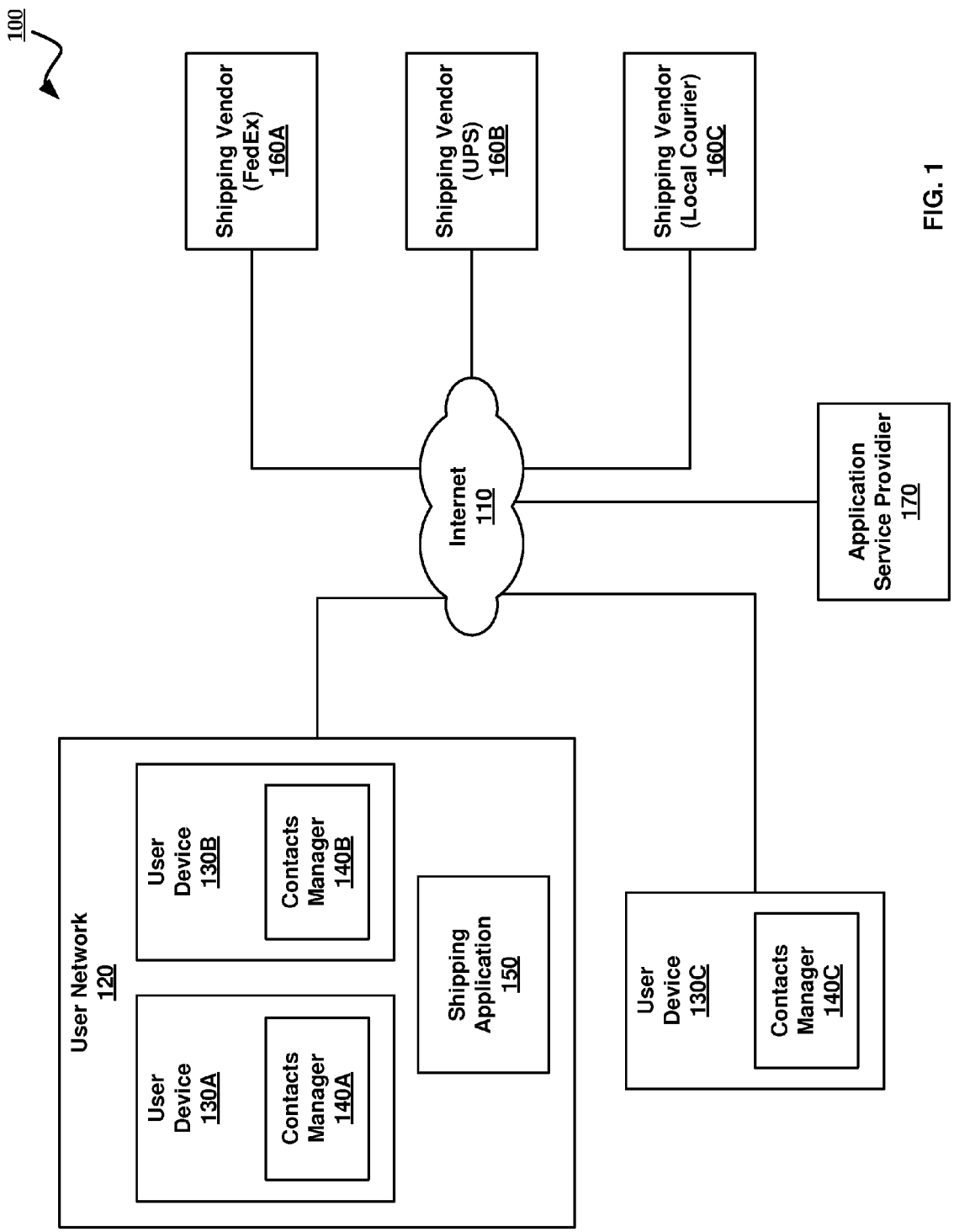
FIG. 1 illustrates an exemplary computerized network in which a system for real-time pricing of shipping vendors may be used.

FIG. 1 illustrates an exemplary computerized network in which a system 100 for real-time pricing of shipping vendors may be used. The Internet 110 allows for communication between user network 120 and various shipping vendors 160A-C. User network 120 may be communicatively coupled to the Internet 110 and include various user devices (e.g., user devices 130A and 130B), which may each include a contacts manager (e.g., contacts manager 140A and 140B respectively), and a shipping application 150. In some embodiments, the system 100 may include a user device 130C, which may include a contacts manager (e.g., contacts manager 140C), communicatively coupled over the Internet 110 to an application service provider (ASP) 170, which provides user device 130C with the same services as shipping application 150.

User network 120 may be a local, proprietary network (e.g., intranet), a part of a larger wide-area network, a hosted network, etc. For example, user network 120 may be a local area network (LAN) in an office. Alternatively, a user network 120 for a large organization may span multiple offices in multiple buildings in multiple locations.

User devices 130A-C may include various computing devices, workstations that allow users to communicate with various other components of system 100. For example, user device 130A allow a user to view displayed information, designate shipping specifications, view real-time pricing information, and designate shipping vendors for shipping label generation, etc.

A user device (e.g., user device 130A) may include a contacts manager (e.g., contacts manager 140A). Contacts manager 140A may be configured to store information regarding various contacts, including addresses, telephone numbers, e-mail addresses, and the like. Contacts manager 140A may further correlate contact information with various shipping specifications (e.g., a particular address, such as a contact's office, may be associated with a particular courier service or particular delivery hours). Examples of contacts managers may include Microsoft Outlook®, Lotus Notes®, etc. Contacts manager 140A may provide various types of contact information to the other components of system 100.

A shipping application 150 may also be installed in user network 120. Described in further detail with respect to FIG. 2, shipping application 150 may allow user devices in user network 120 to perform various communications and transactions with multiple shipping vendors. Shipping application 150 may be any collection of routines that perform various system-level functions and may be dynamically loaded and unloaded by hardware and device drivers as required. The modular software components described herein may also be incorporated as part of a larger software platform or integrated as part of an application specific component. In various embodiments, shipping application 150 may be installed on a server, one or more user devices, or the like. Shipping application 150 allows for a user to request and obtain real-time pricing information from various shipping vendors (e.g., shipping vendors 160A-C), which may include FedEx®, United Parcel Service (UPS®), and DHL®, as well as various local couriers.

Figure 2:
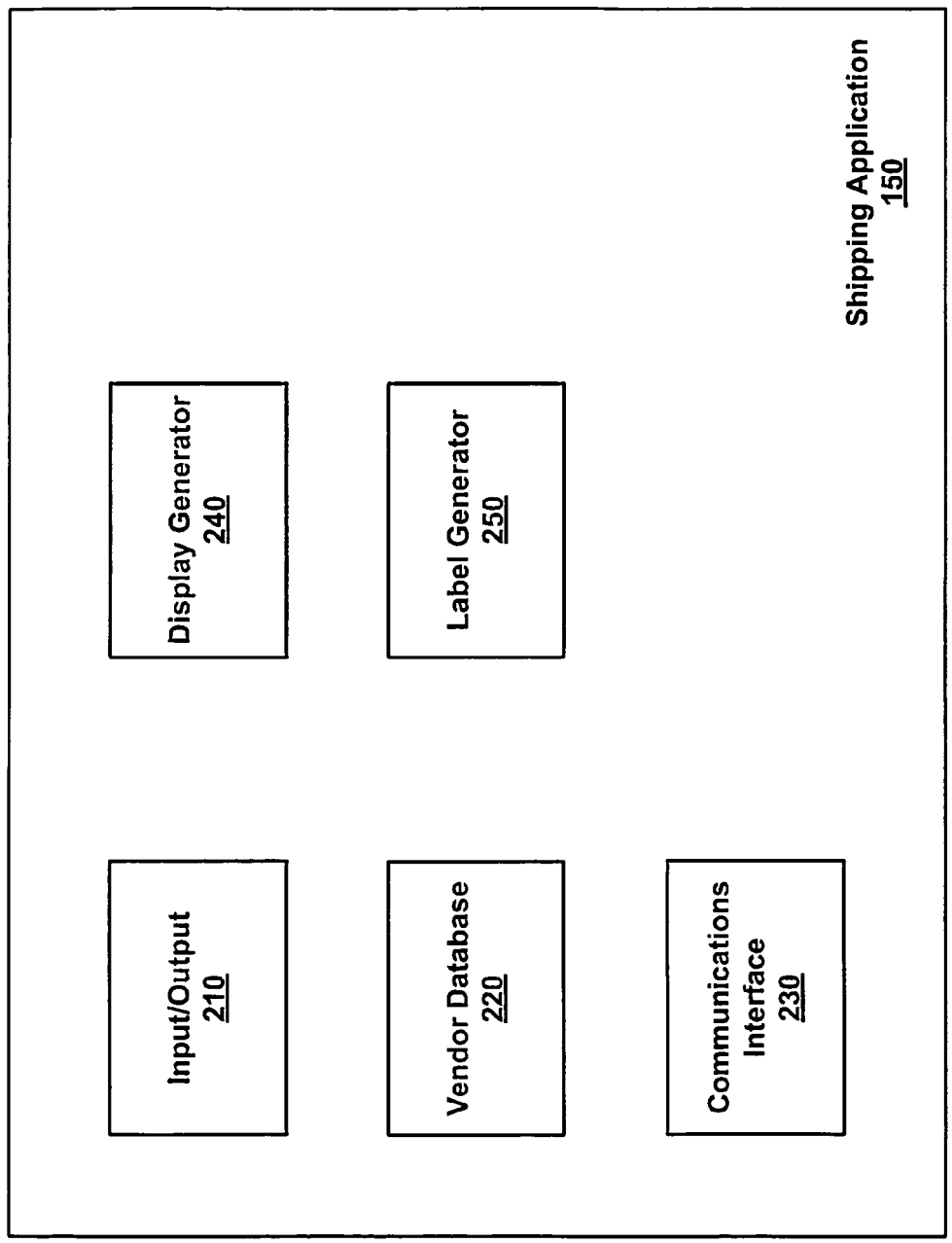
FIG. 2 is a block diagram of an exemplary shipping application for real-time pricing of shipping vendors

FIG. 2 is a block diagram of an exemplary shipping application for real-time pricing of shipping vendors. As illustrated, shipping application 150 may include input/output 210, vendor database 220, communications interface 230, and display generator 240, and label generator 250. However, more or fewer components may be used.

Input/output 210 is configured to communicate with other elements of user network 120 and shipping application 150. Input/output 210 may be configured to communicate using a network port, a wireless connector, an Ethernet or TCP/IP standard, or the like. Information communicated through input/output 210 may include, for example, user designation of various shipping specifications, queries to shipping vendors concerning real-time pricing information based on the various shipping specifications, responses from the shipping vendors, etc.

Vendor database 220 is configured to store information concerning various shipping vendors. The information stored in vendor database 220 may include vendor names, vendor locations, vendor-specific shipping options, user account information for each vendor, etc. Such information may be used as a shipping specification, to configure a user device for communication with a vendor, or the like. In some embodiments, vendor database 220 may further include information concerning user preferences (i.e., using a particular vendor for overnight shipping or using a particular vendor for international shipping), default information, previously designated shipping specifications, and so forth.

Communications interface 230 allows for communication with various shipping vendors. In some embodiments, communications interface 230 may use information provided by vendor database 220 to facilitate various communications and transactions with each shipping vendor. For example, past user preferences may be used to query a shipping vendor. Further, in some cases, obtaining real-time pricing information from a particular vendor may involve using a particular format or a particular interface specific to that vendor. Communications interface 230 may allow for communication with each shipping vendor using various vendor-specific formats and vendor-specific application programming interfaces (APIs) for each shipping vendor. For example, sending a query to FedEx® may involve using an interface specific to FedEx®, sending a query to UPS® may involve using an interface specific to UPS®, sending a query to DHL® may involve using an interface specific to DHL®, sending a query to a local courier may involve using an interface specific to the local courier, and so forth.

Display generator 240 provides a display of real-time pricing information based on various shipping specifications from various shipping vendors. In some embodiments, the display generated by display generator 240 may be sortable by various fields, such as price, time of delivery, etc. The generated display allows the user to compare real-time pricing from multiple shipping vendors. In some embodiments, the display may further include real-time pricing information concerning various add-on services (e.g., insurance, recipient acknowledgement) provided by each shipping vendor, graphics indicating the fastest or least expensive options, graphics concerning packaging (e.g., user-supplied packaging), etc. A user may select one or more shipping vendors from the generated display and/or schedule pick-up time(s).

Label generator 250, generates labels for shipment. Information for the labels may be provided by a user, contacts manager 140A, vendor database 220, shipping vendors 160A-C, or a combination of the foregoing. For example, a user may select a shipping vendor from the display generated by display generator 240. Label generator 250 may then generate one or more shipping labels for the selected shipping vendor. The labels generated may further reflect shipping specifications, pricing information, etc.

Figure 3:
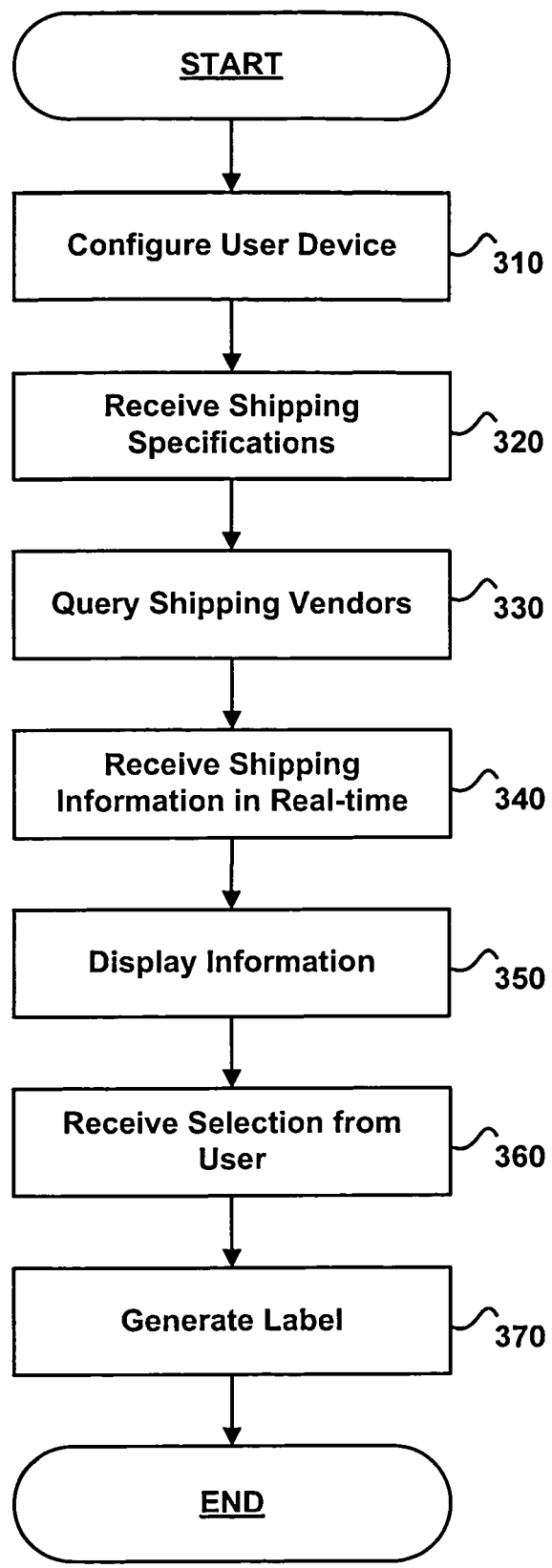
FIG. 3 is a flowchart depicting an exemplary method for real-time pricing of shipping vendors.

FIG. 3 is a flowchart depicting an exemplary method for real-time pricing of shipping vendors. In this method, a user device is configured for communication with various shipping vendors, shipping specifications are received, various shipping vendors are queried based on the specifications, and real-time pricing information is received and displayed. Optionally, a user may choose a vendor, and one or more shipping labels associated with the chosen vendor may be generated.

In step 310, a user device is configured to communicate with various shipping vendors. For example, a new user device (e.g., user device 130A) may be introduced into user network (e.g., user network 120). Such user device 130A may be configured by installing a shipping application (e.g., shipping application 150), using information from an application server in the user network (e.g., user network 120), etc.

In step 320, shipping specifications are received. The shipping specifications may be provided by a contacts manager, vendor database, a user using a user device, a combination of the foregoing, etc. Such shipping specifications may include user location, pick-up location (if different from user location), vendor location, recipient location, and various shipping options, such as time of delivery, method of delivery, packaging type, value, etc. The specifications may be received by shipping application (e.g., input/output 210 of shipping application 150).

In step 330, shipping vendors are queried concerning the shipping specifications. Various embodiments may include querying the shipping vendors asynchronously. Further, each shipping vendor may receive a query in a format and/or through an interface specific to the shipping vendor. For example, sending a query to FedEx® may involve using an API specific to FedEx®, sending a query to UPS® may involve using an API specific to UPS®, and so forth.

In step 340, real-time shipping information is received. The shipping vendors queried may respond to the query sent in step 330 with information concerning available delivery options (e.g., two-day, next morning, ground, etc.), whether the shipping vendors are able to pick up an article, whether the shipping options are available, pricing information concerning the shipment, pricing information concerning any additional shipping options, and so forth.

In step 350, a display is generated including the real-time pricing information from the shipping vendors. FIG. 4 is an exemplary screenshot displaying query results of real-time pricing of shipping vendors. In some embodiments, the display includes a sortable list with various fields. For example, the user may wish to sort by cost, from least to most expensive. Other possible ways of sorting may include sorting by shipping vendor, by pick-up times, by delivery times, etc. In some embodiments, the display will only include information concerning available services and associated pricing. For example, a particular vendor may not offer overnight delivery, so that vendor may not be included in the displayed list. Some embodiments may include real-time pricing information from the various shipping vendors concerning various add-on shipping services. Indications (e.g., graphics, icons, colors) may be used to help identify the shipping option from the shipping vendor that would be the fastest or least expensive, etc.

In step 360, a user selects a shipping vendor from the display generated in step 350. A user may wish to send multiple articles to multiple recipients, so the user may select multiple shipping vendors. A user may select a vendor by clicking on the vendor name, for example. The user may further choose various add-on shipping services.

In step 370, one or more shipping labels are generated based on user selection in step 360. The shipping labels are generally vendor-specific, so selecting FedEx®, for example, may lead to generating a label specific to FedEx®, and selecting UPS® may lead to generating a label specific to UPS®, and so forth. The shipping labels may also reflect information concerning the shipping specifications and services designated in step 320 and/or step 360.

While the present invention has been described in connection with a series of preferred embodiment, these descriptions are not intended to limit the scope of the invention to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. A method for real-time pricing of shipping vendors, the method comprising:

maintaining vendor information in memory concerning a plurality of shipping vendors, the vendor information concerning querying each shipping vendor;

querying each of the plurality of shipping vendors with one or more shipping specifications, each query being specific to the shipping vendor;

receiving real-time pricing information associated with the one or more shipping specifications from one or more of the plurality of shipping vendors, the real-time pricing information including a price generated by the one or more of the plurality of shipping vendors in response to the query;

executing instructions stored in memory, wherein execution of the instructions by a processor generates a menu display of the received real-time pricing information from the one or more of the plurality of shipping vendors;

receiving a designation concerning a chosen shipping vendor, the shipping vendor chosen from the menu display; and generating a shipping label specific to the chosen shipping vendor based on at least the one or more shipping specifications.

2. The method of claim 1, further comprising configuring a user device to receive shipping specifications, communicate with the plurality of shipping vendors, and display received information.

3. The method of claim 2, wherein configuring the user device further comprises storing account information associated with each of the plurality of shipping vendors.

4. The method of claim 1, wherein the one or more shipping specifications is based on information provided by a user.

5. The method of claim 1, wherein the one or more shipping specifications is based on information provided by a contacts manager.

6. The method of claim 1, wherein querying each of the plurality of shipping vendors occurs asynchronously.

7. The method of claim 1, wherein querying each of the plurality of shipping vendors comprises using a vendor-specific interface associated with a shipping vendor from the plurality of shipping vendors.

8. The method of claim 1, wherein the generated menu display further includes shipping options associated with each shipping vendor.

9. A system for real-time pricing of shipping vendors, the system comprising:
   a vendor database in memory and configured to store information concerning a plurality of shipping vendors, the information concerning querying each shipping vendor;
   a communications interface configured to query each of the plurality of shipping vendors for real-time pricing information based on one or more shipping specifications, each query being specific to the shipping vendor, and to receive real-time pricing information associated with the one or more shipping specifications from one or more of the plurality of shipping vendors, the real-time pricing information including a price generated by the one or more of the plurality of shipping vendors in response to the query;
   a display generator stored in memory and executable by a processor to generate a menu display of the real-time pricing information received from the one or more of the plurality of shipping vendors; and
   a label generator configured to generate a shipping label based on the one or more shipping specifications, the shipping label being associated with a chosen shipping vendor, the chosen shipping vendor being chosen from the menu display.

10. The system of claim 9, wherein the communications interface is further configured to query the plurality of shipping vendors asynchronously.

11. The system of claim 9, wherein the communications interface comprises a vendor-specific interface for querying a shipping vendor from the plurality of shipping vendors.

12. The system of claim 9, wherein the query to the plurality of shipping vendors is further based on the one or more shipping specifications.

13. The system of claim 9, wherein the one or more shipping specifications is provided by a user.

14. The system of claim 9, wherein the one or more shipping specifications is based on information provided by a contacts manager.

15. The system of claim 10, wherein the label generator is further configured to generate a plurality of shipping labels, each shipping label associated with a designated shipping vendor from the plurality of shipping vendors.

16. A computer-readable storage medium having embodied thereon at least one program, the at least one program being executable by a processor in a computing device to perform a method for real-time pricing of shipping vendors, the method comprising:
   maintaining vendor information concerning a plurality of shipping vendors, the vendor information concerning querying each shipping vendor;
   querying each of the plurality of shipping vendors with one or more shipping specifications, each query being specific to the shipping vendor;
   receiving real-time pricing information associated with the one or more shipping specifications from one or more of the plurality of shipping vendors, the real-time pricing information including a price generated by the one or more of the plurality of shipping vendors in response to the query;
   generating a menu display of the received real-time pricing information from the one or more of the plurality of shipping vendors;
   receiving a designation concerning a chosen shipping vendor, the shipping vendor chosen from the menu display; and
   generating a shipping label specific to the chosen shipping vendor based on at least the one or more shipping specifications.

17. The computer-readable storage medium of claim 16, wherein the method further comprises configuring a user device to receive shipping specifications, communicate with the plurality of shipping vendors, and display received information.

18. The computer-readable storage medium of claim 16, wherein the method further comprises querying each of the plurality of shipping vendors asynchronously.

19. The computer-readable storage medium of claim 16, wherein the method further comprises querying each of the plurality of shipping vendors using a vendor-specific interface associated with a shipping vendor from the plurality of shipping vendors.

20. The computer-readable storage medium of claim 16, wherein the method further comprises receiving the one or more shipping specifications from a contacts manager.

* * * * *